United States Patent
Line et al.

(10) Patent No.: US 10,773,618 B2
(45) Date of Patent: Sep. 15, 2020

(54) AIR CHANNEL THERMOCOMFORT FOAM PAD

(71) Applicant: Ford Global Technologies, LLC, Dearborn, MI (US)

(72) Inventors: Johnathan Andrew Line, Northville, MI (US); Alan George Dry, Grosse Pointe Woods, MI (US); Spencer Robert Hoernke, Dundas (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/656,032

(22) Filed: Oct. 17, 2019

(65) Prior Publication Data

US 2020/0047648 A1 Feb. 13, 2020

Related U.S. Application Data

(62) Division of application No. 15/832,577, filed on Dec. 5, 2017, now Pat. No. 10,479,243.

(51) Int. Cl.
*B60N 2/56* (2006.01)
*B60N 2/70* (2006.01)

(52) U.S. Cl.
CPC ......... *B60N 2/5657* (2013.01); *B60N 2/5642* (2013.01); *B60N 2/7017* (2013.01); *B60N 2/7094* (2013.01)

(58) Field of Classification Search
None
See application file for complete search history.

(56) References Cited

U.S. PATENT DOCUMENTS

| | | | |
|---|---|---|---|
| 5,902,014 A | 5/1999 | Dinkel et al. |
| 6,079,781 A | 6/2000 | Tilley |
| 6,145,925 A | 11/2000 | Eksin et al. |
| 6,189,966 B1 | 2/2001 | Faust et al. |
| 6,196,627 B1 | 3/2001 | Faust et al. |
| 6,224,150 B1 | 5/2001 | Eksin et al. |
| 6,619,737 B2 | 9/2003 | Kunkel et al. |
| 6,682,140 B2 | 1/2004 | Minuth et al. |

(Continued)

FOREIGN PATENT DOCUMENTS

| | | |
|---|---|---|
| DE | 19857386 A1 | 6/2000 |
| DE | 102006061226 A1 | 6/2008 |

(Continued)

OTHER PUBLICATIONS

Seat Comfort Systems, Installation Manual, KIT P/N: SCSOOOOOC3, http://www.techwebasto.com/accessories_main/seat_accessories/g_scs_vent_install.pdf, accessed Apr. 27, 2017, 7 pgs.

(Continued)

*Primary Examiner* — David E Allred
(74) *Attorney, Agent, or Firm* — David Coppiellie; Price Heneveld LLP

(57) ABSTRACT

A method of making a cushion assembly includes forming a first foam pad with a plurality of air cooling columns through the first foam pad. The plurality of air cooling columns terminate at a topper pad. A second foam pad is operably coupled with the first foam pad to define a non-linear flow channel between the first foam pad and the second foam pad. The non-linear flow channel is in fluid communication with the air cooling columns. An air mover is operably coupled to the non-linear flow channel to move air within the air cooling columns.

15 Claims, 6 Drawing Sheets

(56) References Cited

U.S. PATENT DOCUMENTS

| | | |
|---|---|---|
| 6,736,452 B2 | 5/2004 | Aoki et al. |
| 6,808,230 B2 | 10/2004 | Buss et al. |
| 6,848,742 B1 | 2/2005 | Aoki et al. |
| 6,869,140 B2 | 3/2005 | White et al. |
| 6,988,770 B2 | 1/2006 | Witchie |
| 7,100,978 B2 | 9/2006 | Ekern et al. |
| 7,213,876 B2 | 5/2007 | Stowe |
| 7,229,129 B2 | 6/2007 | White et al. |
| 7,261,371 B2 | 8/2007 | Thunissen et al. |
| 7,425,034 B2 | 9/2008 | Bajic et al. |
| 7,467,823 B2 | 12/2008 | Hartwich |
| 7,478,869 B2 | 1/2009 | Lazanja et al. |
| 7,506,924 B2 | 3/2009 | Bargheer et al. |
| 7,506,938 B2 | 3/2009 | Brennan et al. |
| 7,510,239 B2 | 3/2009 | Stöwe |
| 7,578,552 B2 | 8/2009 | Bajic et al. |
| 7,695,062 B2 | 4/2010 | Stöwe |
| 7,735,932 B2 | 6/2010 | Lazanja et al. |
| 7,775,602 B2 | 8/2010 | Lazanja et al. |
| 7,794,012 B2 | 9/2010 | Szablewski |
| 7,802,843 B2 | 9/2010 | Andersson et al. |
| 7,862,113 B2 | 1/2011 | Knoll |
| 7,931,330 B2 | 4/2011 | Itou et al. |
| 7,963,595 B2 | 6/2011 | Ito et al. |
| 7,966,835 B2 | 6/2011 | Petrovski |
| 7,971,931 B2 | 7/2011 | Lazanja et al. |
| 8,038,222 B2 | 10/2011 | Lein et al. |
| D655,393 S | 3/2012 | Whitaker |
| 8,162,391 B2 | 4/2012 | Lazanja et al. |
| 8,360,517 B2 | 1/2013 | Lazanja et al. |
| 8,516,842 B2 | 8/2013 | Petrovski |
| 8,678,500 B2 | 3/2014 | Lem et al. |
| 8,696,067 B2 | 4/2014 | Galbreath et al. |
| 9,096,157 B2 | 8/2015 | Line et al. |
| 9,272,647 B2 | 3/2016 | Gawade et al. |
| 9,320,361 B2 | 4/2016 | Gaines et al. |
| 2002/0096915 A1 | 7/2002 | Haupt et al. |
| 2004/0195870 A1 | 10/2004 | Bohlender et al. |
| 2004/0265184 A1 | 12/2004 | Matsuda et al. |
| 2005/0200166 A1 | 9/2005 | Noh |
| 2007/0120401 A1 | 5/2007 | Minuth et al. |
| 2007/0200398 A1 | 8/2007 | Wolas et al. |
| 2009/0033130 A1 | 2/2009 | Marquette et al. |
| 2009/0066122 A1 | 3/2009 | Minuth et al. |
| 2009/0090172 A1 | 4/2009 | Angelescu et al. |
| 2009/0134677 A1 | 5/2009 | Maly et al. |
| 2009/0152909 A1 | 6/2009 | Andersson |
| 2009/0322124 A1 | 12/2009 | Barkow et al. |
| 2010/0038937 A1 | 2/2010 | Andersson et al. |
| 2010/0327636 A1 | 12/2010 | Stoll et al. |
| 2011/0109127 A1 | 5/2011 | Park et al. |
| 2011/0109128 A1 | 5/2011 | Axakov et al. |
| 2011/0133525 A1 | 6/2011 | Oota |
| 2011/0186560 A1 | 8/2011 | Kennedy et al. |
| 2011/0248532 A1 | 10/2011 | Kim et al. |
| 2011/0260509 A1 | 10/2011 | Siu |
| 2012/0080911 A1 | 4/2012 | Brykalski et al. |
| 2012/0129440 A1 | 5/2012 | Kitaguchi et al. |
| 2012/0261974 A1 | 10/2012 | Yoshizawa et al. |
| 2012/0267937 A1 | 10/2012 | Sahashi |
| 2014/0152057 A1 | 6/2014 | Truant et al. |
| 2015/0118426 A1 | 4/2015 | Roberts |
| 2017/0210258 A1 | 7/2017 | Cheon |
| 2018/0022252 A1 | 1/2018 | Arata et al. |
| 2019/0061573 A1 | 2/2019 | Dry et al. |

FOREIGN PATENT DOCUMENTS

| | | |
|---|---|---|
| DE | 102010012212 A1 | 5/2012 |
| DE | 102012006074 A1 | 11/2012 |
| EP | 1050429 A2 | 11/2000 |
| EP | 1123834 A1 | 8/2001 |
| EP | 1266794 A2 | 12/2002 |
| EP | 2423040 A2 | 2/2012 |
| JP | 2011251573 A | 12/2011 |
| KR | 20080066428 A | 7/2008 |
| KR | 20110051692 A | 5/2011 |
| KR | 101180702 B1 | 9/2012 |
| WO | 2006131189 A1 | 12/2006 |
| WO | 2007028015 A2 | 3/2007 |

OTHER PUBLICATIONS

Mercedes-Benz, "Interior comfort—spoilt for choice", http://www.zungfu.com/pc_E_saloon.comfort.1.shtml, Feb. 28, 2013, 3 pgs.

AIR CHANNEL THERMOCOMFORT FOAM PAD

CROSS-REFERENCE TO RELATED APPLICATION

This application is a divisional of U.S. application Ser. No. 15/832,577, filed on Dec. 5, 2017, entitled "AIR CHANNEL THERMOCOMFORT FOAM PAD," the disclosure of which is hereby incorporated herein by reference in its entirety.

FIELD OF THE DISCLOSURE

The present disclosure generally relates to a foam pad, and more particularly to a molded air channel thermocomfort foam pad.

BACKGROUND OF THE DISCLOSURE

Properly ventilated seating assemblies are becoming more important as the need for prolonged travel increases. Maintaining the posterior of an occupant at a comfortable temperature creates a more pleasant and comfortable ride.

SUMMARY OF THE DISCLOSURE

According to one aspect of the present disclosure, a method of making a cushion assembly includes forming a first foam pad with a plurality of air cooling columns through the first foam pad. The plurality of air cooling columns terminate at a topper pad. A second foam pad is operably coupled with the first foam pad to define a non-linear flow channel between the first foam pad and the second foam pad. The non-linear flow channel is in fluid communication with the air cooling columns. An air mover is operably coupled to the non-linear flow channel to move air within the air cooling columns.

According to another aspect of the present disclosure, a method of making a cushion assembly includes forming a first foam pad with a plurality of air cooling columns through the first foam pad. The plurality of air cooling columns includes a first air column and a second air column. The plurality of air cooling columns terminate at a topper pad. A second foam pad is operably coupled with the first foam pad to define a flow channel between the first foam pad and the second foam pad. The flow channel is in fluid communication with the air cooling columns, exits a top portion of the first air column, and enters a lower portion of the second air column. An air mover is operably coupled to the flow channel to move air within the air cooling columns.

Embodiments of the first and second aspects of the present disclosure, as set forth in the preceding paragraphs, can include any one or a combination of the following features:

- forming the non-linear flow channel to include a vertical portion and a horizontal portion;
- blowing the air through the non-linear flow channel from the air mover to an air exhaust;
- forming a recessed periphery about the plurality of air cooling columns, proximate the topper pad;
- forming the topper pad to be substantially porous;
- forming the plurality of air cooling columns to include a first air column and a second air column, wherein the non-linear flow channel exits a top portion of the first air column and enters a lower portion of the second air column;
- forming the plurality of air columns so that the air flows turbulently through the plurality of air columns;
- forming the plurality of air columns to include at least three columns aligned linearly;
- forming the flow channel to include a vertical portion and a horizontal portion; and
- blowing the air through the flow channel from the air mover to an air exhaust.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
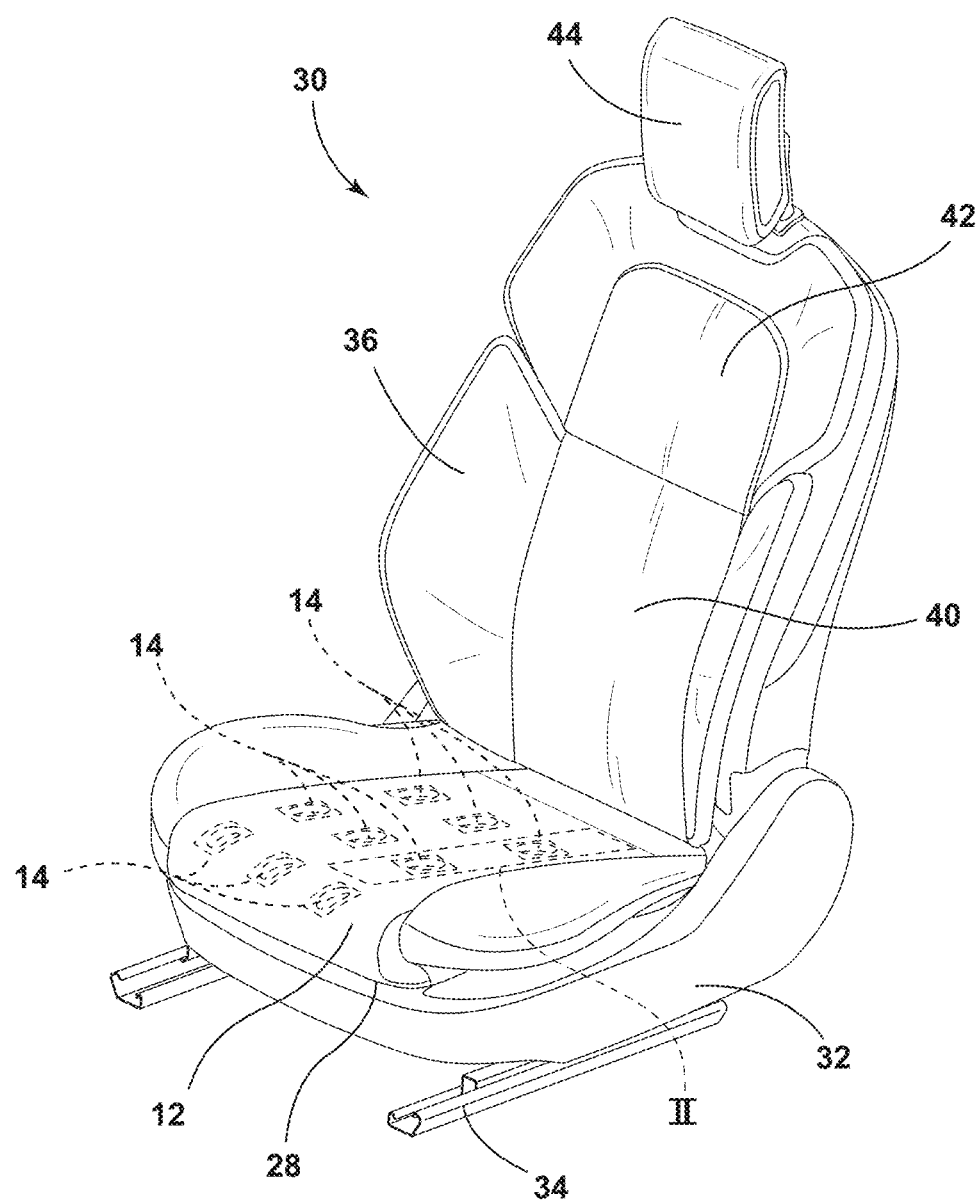
FIG. 1 is a front perspective view of a seat cushion assembly of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Traditional expanded polypropylene (EPP) pads used for cushion assemblies are difficult to cool within seating assemblies. Adding cooling holes for ventilation in an EPP pad can result in failures of these cushion assemblies. These failures typically result from point loading or abuse loading that results high tensile stresses that occur at the bottom of an EPP pad or the cushion assembly. As a result, an improved construction that can better manage point loading or abuse loading would prove beneficial.

Referring to the embodiment generally illustrated in FIGS. 1-10, reference numeral 10 generally designates a seat cushion assembly that includes a first foam pad 12 defining at least one air cooling column 14 disposed therethrough. A topper pad 16 is disposed over the first foam pad 12 and the at least one air cooling column 14. A second foam pad 18 is disposed below the first foam pad 12. The second foam pad 18 and the first foam pad 12 define a flow channel 20 in fluid communication with the at least one air cooling column 14. An air mover 22 moves air from an air intake 24 of the flow channel 20 to an air exhaust 26 of the flow channel 20.

Figure 2:
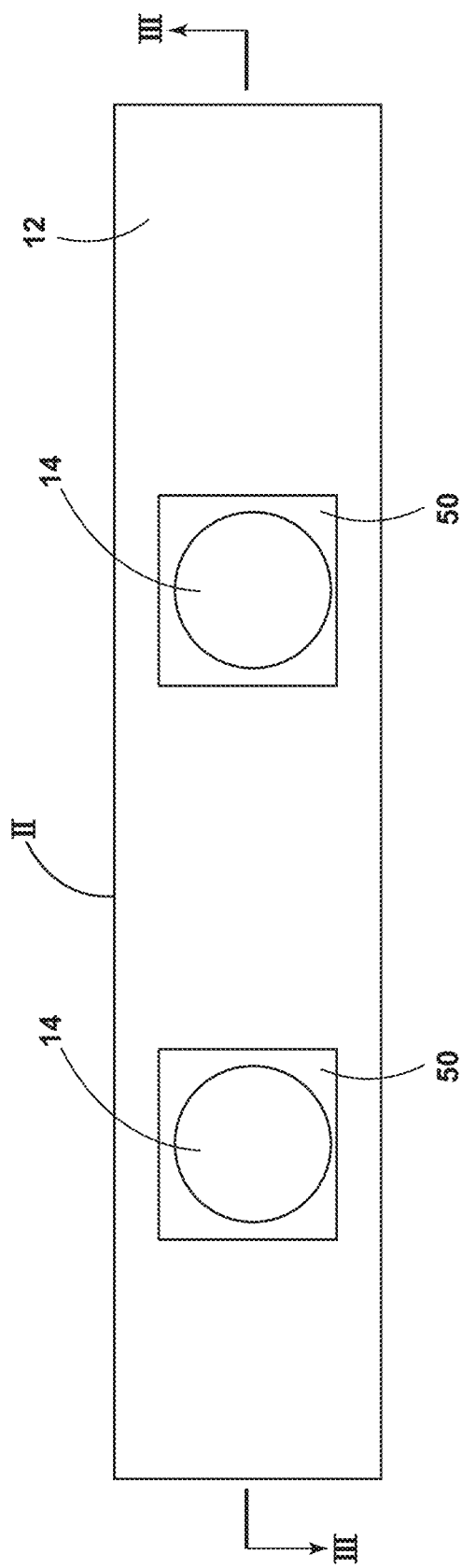
FIG. 2 is a front elevational view of a first foam pad of the seat cushion assembly of FIG. 1 taken at area II.

With reference now to FIGS. 1 and 2, the seat cushion assembly 10 is disposed in a seat 28 of a seating assembly 30 and may be used in any vehicle, such as a car, a truck, a van, etc. It is also contemplated that the concept set forth in this disclosure may be utilized in a front or forward position of the vehicle as well as a rear or rearward position of the vehicle. The seat cushion assembly 10, as illustrated, includes a seat base 32 that is positioned on rail slides 34 to allow fore and aft movement of the seat cushion assembly 10 relative to the vehicle. The seat 28 is operably coupled with the seat base 32 and is movable relative thereto, as set forth in further detail below. In addition, a seatback 36 of the seating assembly 30 includes a lower lumbar region 40 and an upper thoracic region 42 as well as a head restraint 44. Each of the components of the seatback 36 may be configured for adjustability to properly support the weight of different sized occupants inside the vehicle.

Figure 3:
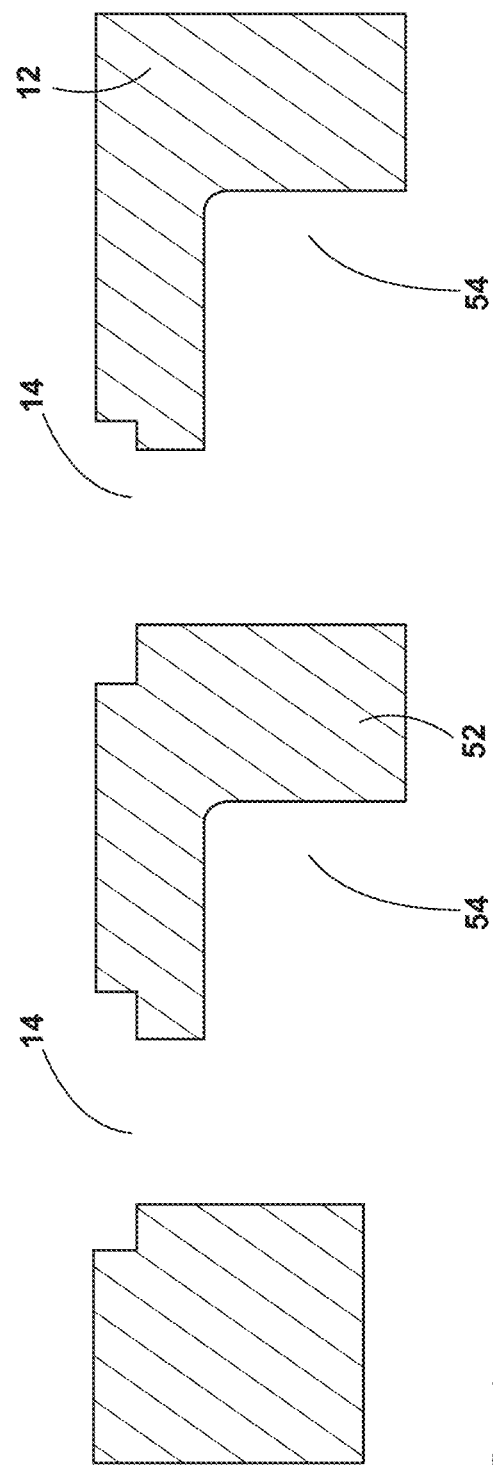
FIG. 3 is a front elevational cross-sectional view of the first foam pad of the seat cushion assembly of FIG. 2 with air cooling columns.

With reference now to FIGS. 2 and 3, one aspect of the seat cushion assembly 10 is illustrated taken at area II of FIG. 1. Specifically, the first or upper foam pad 12 is illustrated. The upper foam pad 12 is configured to provide support to the buttocks of an occupant, and is also configured to provide cooling to the buttocks of the occupant. Two air cooling columns 14 are illustrated in area II. However, it will be understood that any number of air cooling columns may be present through the upper foam pad 12. As shown in FIG. 3, the air cooling columns 14 are open at a top portion thereof and include a recessed periphery 50 that aids in cooling an occupant. A bottom portion 52 of the first foam pad 12 includes enlarged recesses 54 that, together with the second foam pad 18, define the flow channels 20. It will be understood that the first foam pad 12 may take on a variety of shapes and constructions, and that the illustrated construction is exemplary.

Figure 4:
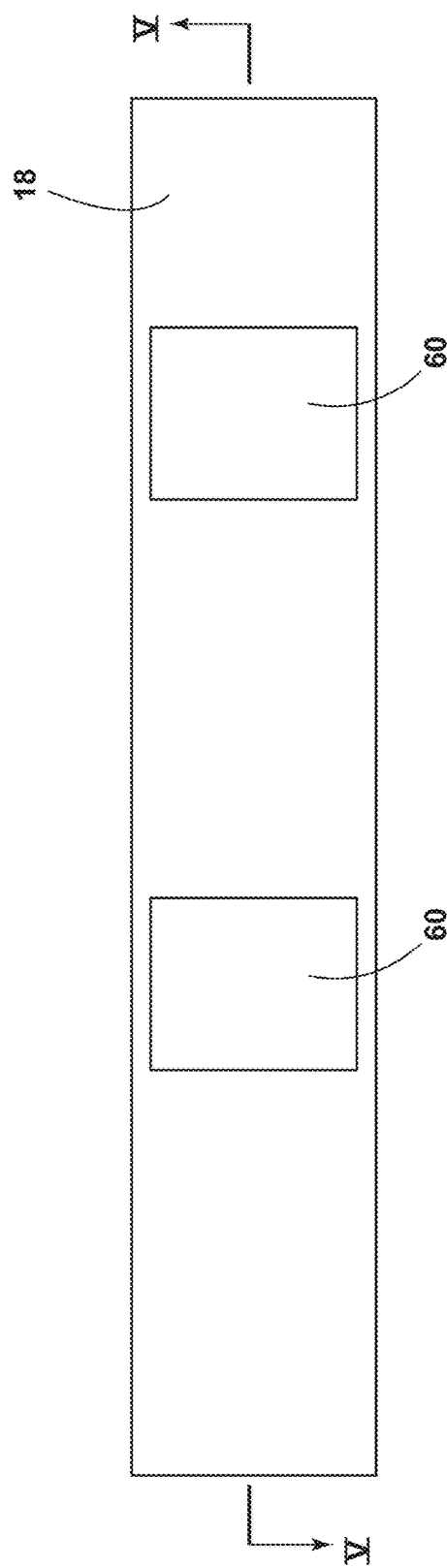
FIG. 4 is a front elevational view of a second foam pad of the seat cushion assembly of FIG. 1 taken at area V.
Figure 5:
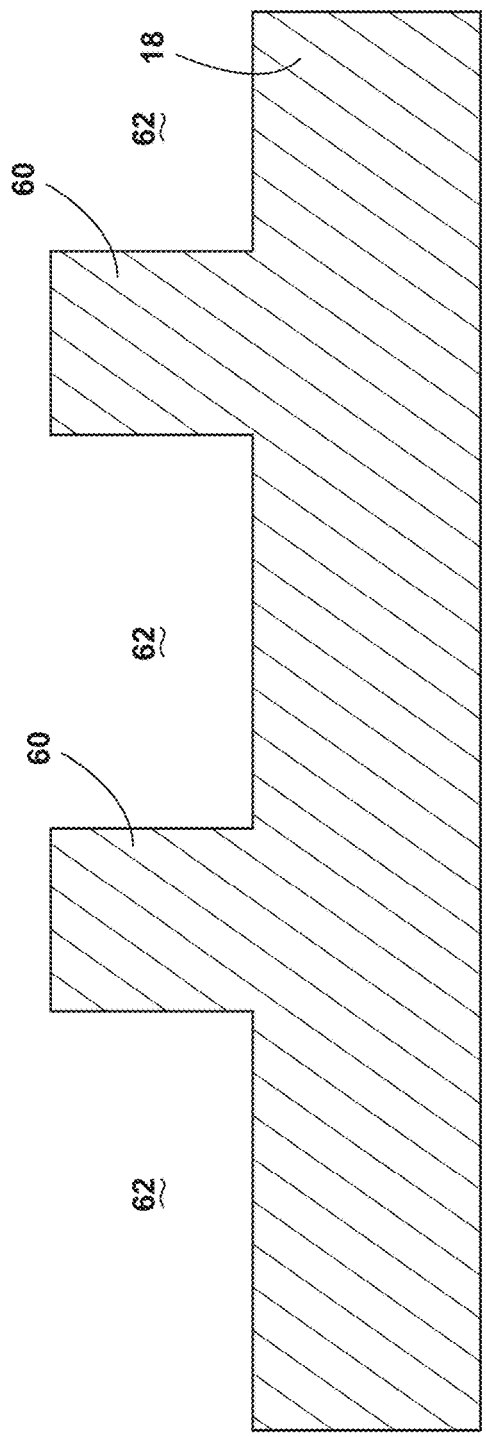
FIG. 5 is a front elevational cross-sectional view of the second foam pad of the seat cushion assembly of FIG. 4 with upwardly extending columns.

With reference now to FIGS. 4 and 5, the second or lower foam pad 18 is illustrated. The second foam pad 18 includes upwardly extending columns 60 configured to protrude into the recesses 54 of the first foam pad 12. The second foam pad 18 includes a top portion thereof that defines cavities 62. The cavities 62 and the columns 60 of the first and second foam pads 12, 18 together define the flow channel 20. As with the first foam pad 12, the second foam pad 18 may take on a variety of shapes and constructions and is not limited to the construction as set forth in FIGS. 4 and 5.

Figure 6:
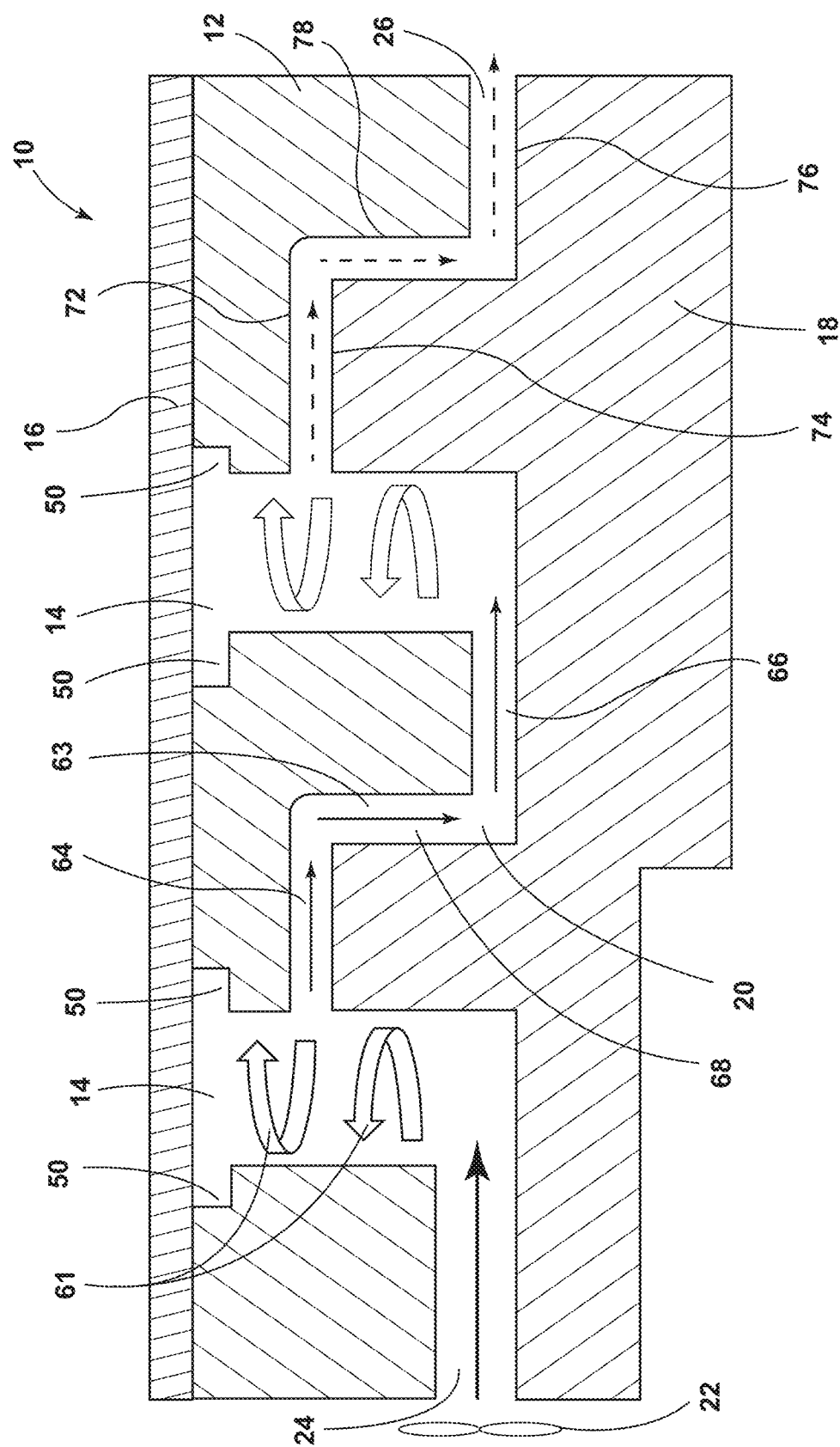
FIG. 6 is a front elevational cross-sectional view of a seat cushion assembly of the present disclosure.

With reference now to FIG. 6, the seat cushion assembly 10 that is made up by the topper pad 16, the first foam pad 12, and the second foam pad 18 is illustrated. The topper pad 16 is generally porous in construction so that fluid or air can pass through the topper pad 16. It will be understood that air may be drawn into or blown out of the topper pad 16. The air mover 22 pushes air through the air intake 24 of the flow channel 20. The air mover 22 may be a blower that forces air from the air intake 24 of the flow channel 20 to the air exhaust 26 of the flow channel 20. In the illustrated embodiment, the air intake 24 is oriented in a horizontal direction relative to the seat cushion assembly 10. However, it will be understood that the air intake 24 may also be oriented in a vertical direction relative to the seat cushion assembly 10. The air mover 22 pushes air into the air intake 24 of the flow channel 20 until the air reaches the first vertical air cooling column 14. The air may then move in a turbulent fashion, generally in the direction of arrows 61, cooling the topper pad 16, and consequently, cooling the occupant. Air is also forced into a first internal transfer portion 63 of the flow channel 20. The first internal transfer portion 63 includes a first lateral portion 64 that connects with a second lateral portion 66 by way of a vertical portion 68. The flow of fluid, which may be air, is generally laminar as the fluid passes through the first internal transfer portion 63. However, the flow of fluid is generally turbulent within the first and second air cooling columns 14. It will be understood that this construction is exemplary and that other constructions may also be utilized. Air, which is still somewhat cool, but which has received some heat gain from the first air cooling column 14, is then driven into the second air cooling column 14, to cool the topper pad 16, and consequently, the occupant, at a location proximate the second air cooling column 14. Air is also forced along the back portion of the air cooling column 14 and into a second internal transfer portion 72 that includes a first lateral portion 74 that connects with a second lateral portion 76 by way of a vertical portion 78. The warmed air ultimately exits the seat cushion assembly 10 through the air exhaust 26.

Figure 8:
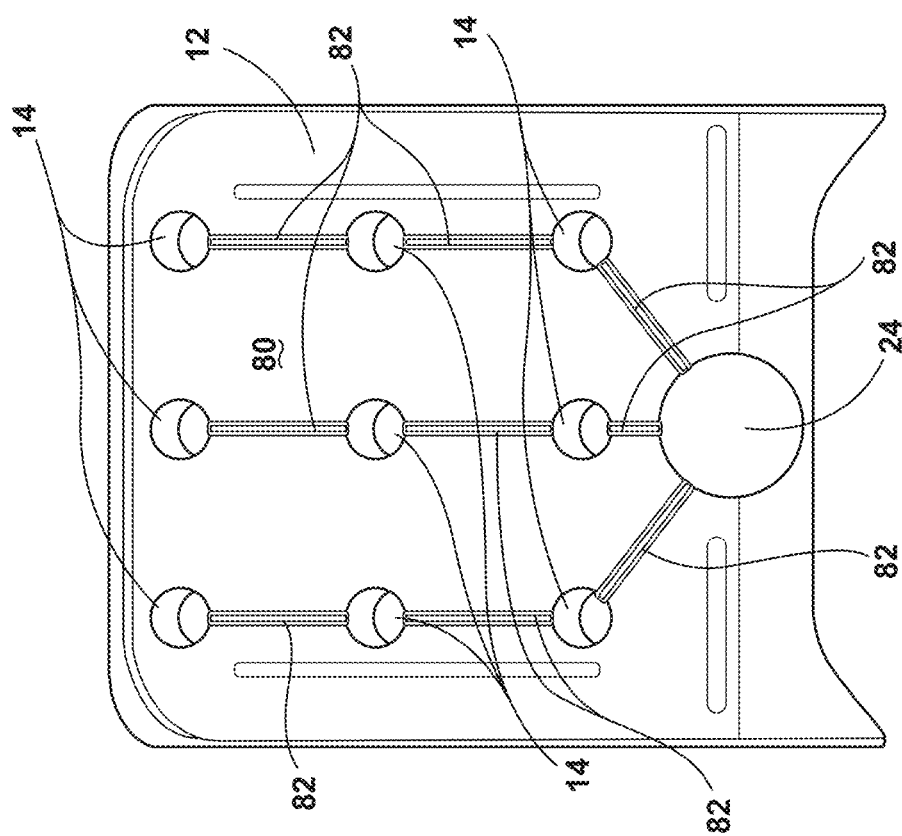
FIG. 8 is a rear elevational view of the upper foam pad of the seat cushion assembly of FIG. 7.
Figure 7:
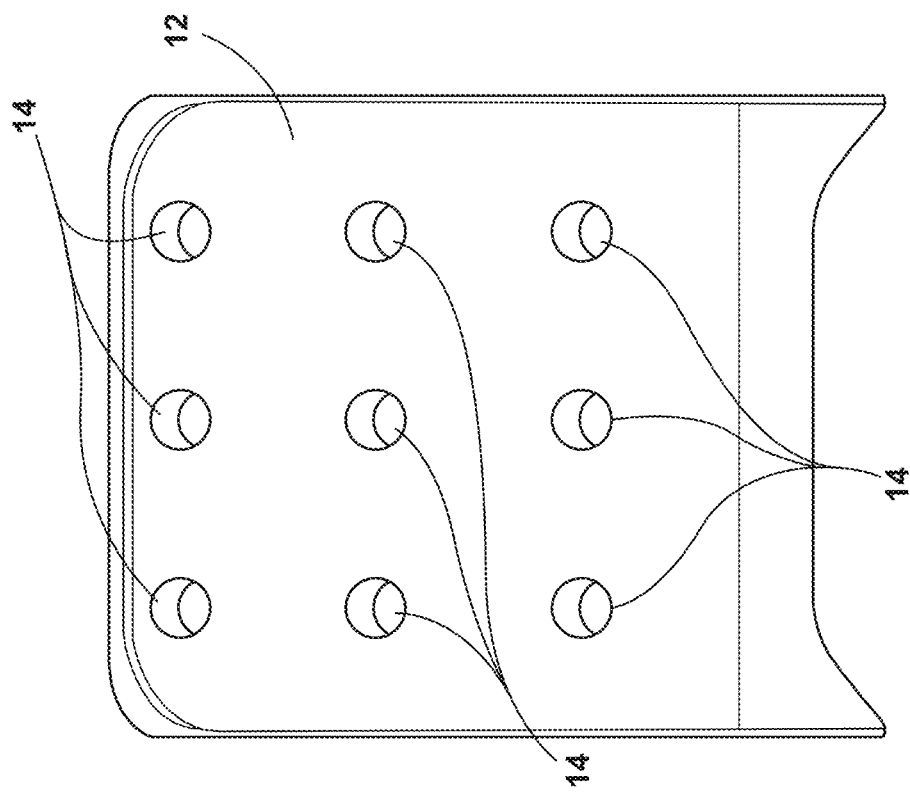
FIG. 7 is a front elevational view of an upper foam pad of the seat cushion assembly of FIG. 6 with a plurality of air cooling columns.

With reference now to FIGS. 7 and 8, one example of the upper foam pad 12 is illustrated. The upper foam pad 12, as shown in FIG. 8, illustrates a plurality of air cooling columns 14. In addition, a bottom side 80 of the upper foam pad 12 includes the plurality of air cooling columns 14, which are in fluid connection via grooves 82 that form a portion of the flow channels 20. Each of the grooves 82 is in communication with an air mover hole, which defines the air intake 24. It will be understood that the air mover 22 may draw air from the topper pad 16 of the seat cushion assembly 10, or may push air toward the topper pad 16 of the seat cushion assembly 10.

Figure 10:
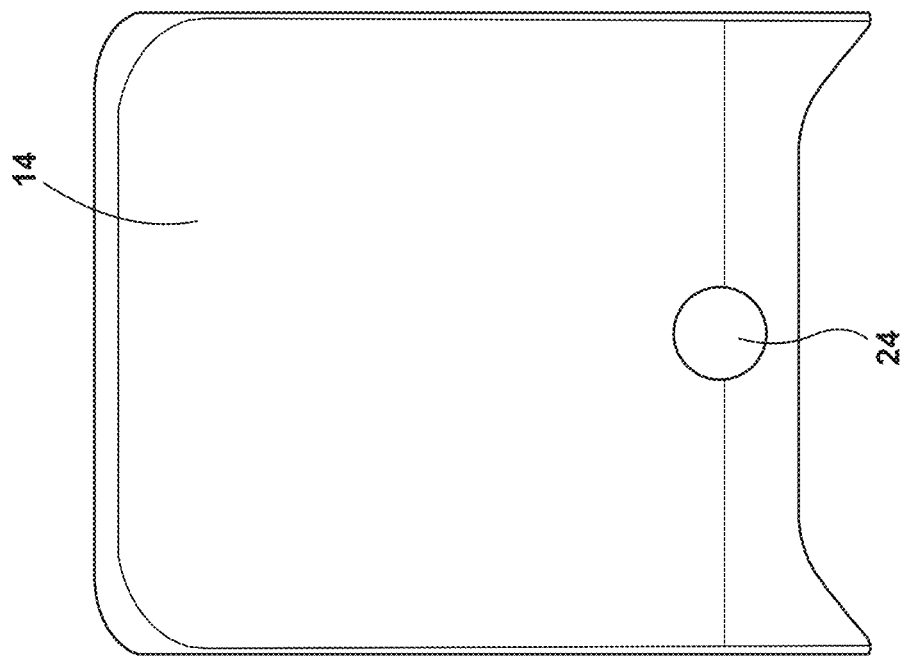
FIG. 10 is a rear elevational view of the second foam pad of the seat cushion assembly of FIG. 9.
Figure 9:
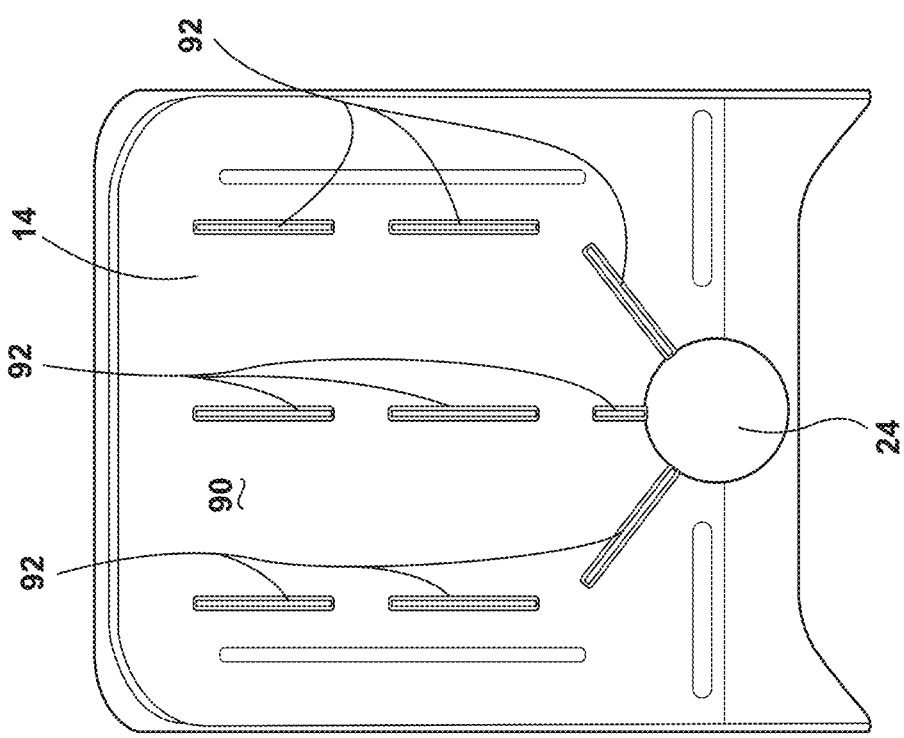
FIG. 9 is a front elevational view of a second foam pad of a seat cushion assembly of the present disclosure.

With reference now to FIGS. 9 and 10, the second foam pad 18 is illustrated. The second foam pad 18 is similar in construction to the first foam pad 12, but lacks air cooling columns 14 that are in communication with the topper pad 16. However, a top side 90 of the second foam pad 18 does include a plurality of grooves 92 that, together with the grooves 82 of the top foam pad 12, define the flow channels 20. As with the grooves 82 of the first foam pad 12, the grooves 92 of the bottom foam pad 18 are ultimately in communication with the air mover hole at a rear portion of the seat cushion assembly 10. Attachment features are disposed below the second foam pad 18 and are configured to secure the second foam pad 18 to an underlying seating suspension assembly.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A method of making a cushion assembly, the method comprising:
   forming a first foam pad;
   forming a plurality of vertically elongate air cooling columns through the first foam pad;
   terminating the plurality of air cooling columns at a topper pad;
   coupling a second foam pad with the first foam pad to define a non-linear flow channel between the first foam pad and the second foam pad, the non-linear flow channel being in fluid communication with the air cooling columns; and
   coupling an air mover to the non-linear flow channel to move air within the air cooling columns;
   wherein at least one of the first foam pad and the second foam pad comprises an L-shaped section and the other of the first foam pad and the second foam pad comprises a protruding portion section that together with the L-shaped section defines at least a portion of the flow channel that interconnects the plurality air cooling columns.

2. The method of claim 1, further comprising:
   forming the non-linear flow channel to include a vertical portion and a horizontal portion.

3. The method of claim 1, further comprising:
   blowing the air through the non-linear flow channel from the air mover to an air exhaust.

4. The method of claim 1, further comprising:
   forming a recessed periphery about the plurality of air cooling columns, proximate the topper pad.

5. The method of claim 1, further comprising:
   forming the topper pad to be substantially porous.

6. The method of claim 1, further comprising:
   forming the plurality of air cooling columns to include a first air column and a second air column, wherein the non-linear flow channel exits a top portion of the first air column and enters a lower portion of the second air column.

7. The method of claim 1, further comprising:
   forming the plurality of air columns so that the air flows turbulently through the plurality of air columns.

8. The method of claim 1, further comprising:
   forming the plurality of air columns to include at least three columns aligned linearly.

9. A method of making a cushion assembly, the method comprising:
   forming a first foam pad;
   forming a plurality of air cooling columns through the first foam pad, the plurality of air cooling columns including a first air column and a second air column;
   terminating the plurality of air cooling columns at a topper pad;
   coupling a second foam pad with the first foam pad to define a flow channel between the first foam pad and the second foam pad, the flow channel being in fluid communication with the air cooling columns, wherein the flow channel exits a top portion of the first air column and enters a lower portion of the second air column; and
   coupling an air mover to the flow channel to move air within the air cooling columns.

10. The method of claim 9, further comprising:
    forming the flow channel to include a vertical portion and a horizontal portion.

11. The method of claim 9, further comprising:
    blowing the air through the flow channel from the air mover to an air exhaust.

12. The method of claim 9, further comprising:
    forming a recessed periphery about the plurality of air cooling columns, proximate the topper pad.

13. The method of claim 9, further comprising:
    forming the topper pad to be substantially porous.

14. The method of claim 9, further comprising:
forming the plurality of air columns so that the air flows turbulently through the plurality of air columns.

15. The method of claim 9, further comprising:
forming the plurality of air columns to include at least three columns aligned linearly.

* * * * *